United States Patent [19]

Mitsuhira et al.

[11] Patent Number: 5,325,489
[45] Date of Patent: Jun. 28, 1994

[54] DATA TRANSFER CONTROL DEVICE USING DIRECT MEMORY ACCESS

[75] Inventors: Yuko Mitsuhira; Tsuyoshi Katayose, both of Tokyo, Japan

[73] Assignee: NEC Corporation, Tokyo, Japan

[21] Appl. No.: 913,279

[22] Filed: Jul. 14, 1992

[30] Foreign Application Priority Data

Jul. 15, 1991 [JP] Japan ................... 3-172853

[51] Int. Cl.$^5$ .............................................. G06F 13/00
[52] U.S. Cl. .................................... 395/275; 395/425
[58] Field of Search ............... 395/200, 275, 425, 400

[56] References Cited

U.S. PATENT DOCUMENTS 4,430,705 2/1984 Cannavino et al. ................. 395/400

*Primary Examiner*—Robert L. Richardson
*Attorney, Agent, or Firm*—Whitham & Marhoefer

[57] ABSTRACT

When DMA transfer for a DMA transfer area is completed, DMA transfer for the next area may be continuously executed or stopped. In addition to this, if there is a need to urgently stop DMA transfer being executed, DMA transfer can be immediately stopped without waiting for the end of DMA transfer currently executed. For continuous DMA transfer for a plurality of DMA transfer areas, the device may be provided with an authorization bit to authorize DMA transfer operation and a next area authorization bit to authorize DMA transfer for the next area and the contents in the next area authorization bit are set to the DMA authorization bit when the terminal counter which counts the number of DMA transfer data reaches the predetermined value due to decrement. Depending on the contents in the DMA authorization bit, DMA transfer may be continued or stopped when the next DMA transfer request is generated. In addition, DMA transfer may be stopped in emergency by directly setting the applicable value at the DMA authorization bit.

6 Claims, 10 Drawing Sheets

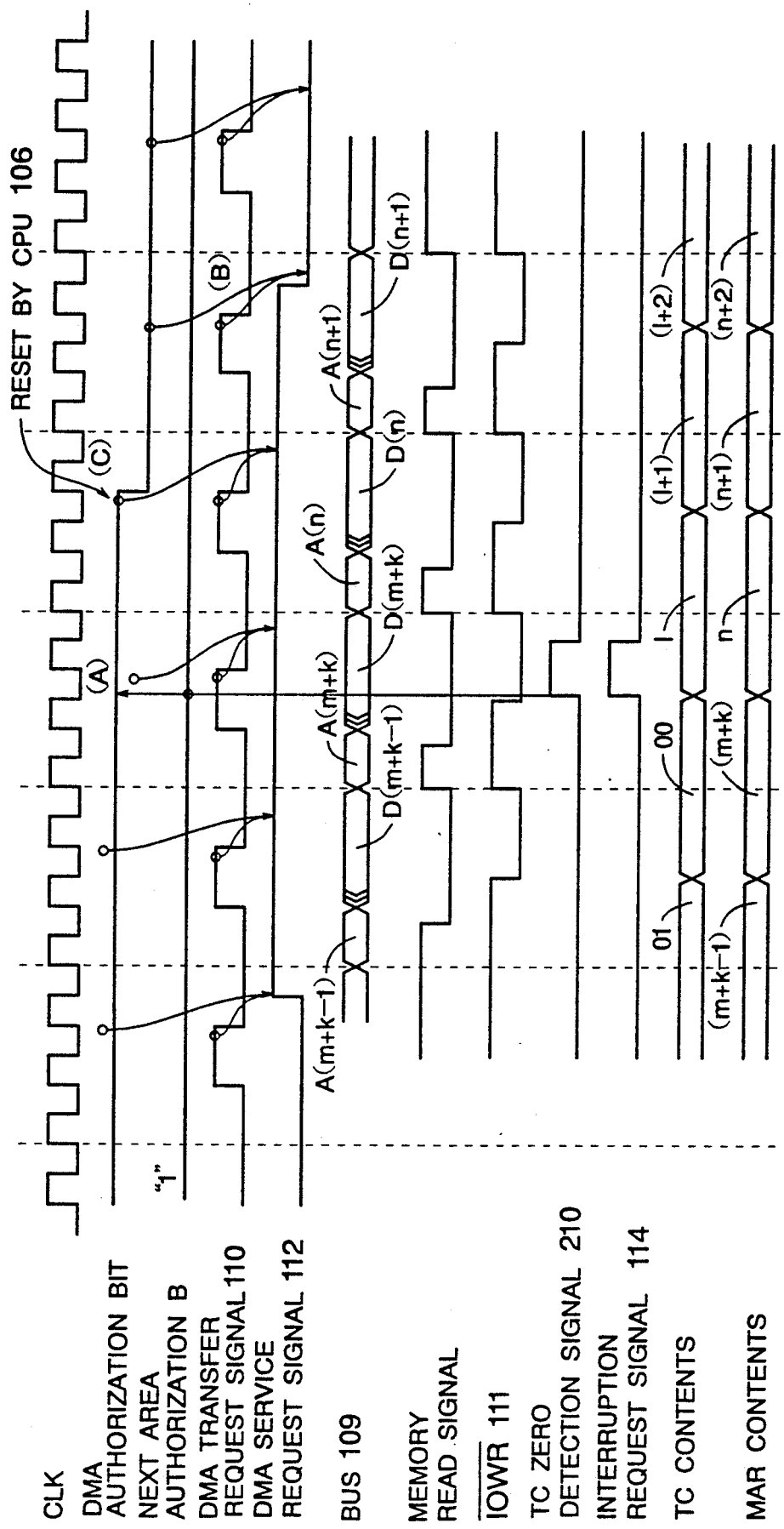

DATA TRANSFER CONTROL DEVICE USING DIRECT MEMORY ACCESS

BACKGROUNDS OF THE INVENTION

1. Field of the Invention

This invention relates to a data transfer control device using direct memory access (DMA) method for data transfer between a memory and a peripheral, and particularly relates to a data transfer control device for easy switching between execution and inhibition of data transfer.

2. Description of the Prior Art

In an information processing system using a microcomputer, a bulk of data is often transferred between peripherals and memories, processed at the central processing unit (CPU) and then transferred to other peripherals or external storage. For example, in a print control processing system, a CPU receives data from another computer, processes the received data and, each time the printer sends a transfer request, sends a data representing one character. In such procedures, if a peripheral (printer) generates an interruption to the CPU for data transfer above using an interrupt routine, overhead at the CPU increases resulting in lower data processing efficiency of the system. To avoid such drawback, direct memory access controller (DMA controller) is used as a data transfer controller exclusively used for data transfer.

For data transfer with a DMA controller (DMA transfer), various control information including the memory address for DMA transfer and the number of DMA transfers is set in the DMA controller in advance through execution of instruction by the CPU. Then, when the DMA controller detects a DMA transfer request from a peripheral, the DMA controller requests the CPU to give the right to use the bus. When the CPU detects this request, it grants the right to use buses including the address bus and data bus to the DMA controller. The DMA controller uses an empty bus to generate address information and read/write control signal for processing to transfer the data stored in the memory to the peripheral which has generated the DMA transfer request.

When the DMA controller completes data transfer for the required number of transfers by repeating such a DMA transfer operation, it notifies the CPU of the DMA transfer completion. The CPU detecting the DMA completion executes the interrupt processing and the interrupt processing program routine. In this interruption processing program routine, the CPU resets the control information at the DMA controller to prepare for the next DMA transfer execution and starts DMA transfer again. In execution of such DMA transfer, if the memory space subjected to DMA transfer is limited, the above memory is usually divided into a plurality of areas for execution of DMA transfer so that the areas are alternatively transferred.

Conventional data transfer from a memory to a peripheral using a DMA controller is briefly described below.

A DMA controller is provided with a memory address register to store the address information to be DMA transferred and a terminal counter to store the number of transfer data, and a DMA control register having a DMA authorization bit to specify authorization/inhibition of DMA transfer. The CPU sets DMA transfer starting address to the memory address register and the number of DMA transfer data to the terminal counter before the start of DMA transfer. When the DMA controller detects DMA transfer request signal from a peripheral, it obtains the right to use the bus from the CPU and executes DMA transfer between the memory and the peripheral. The memory has, in addition to a CPU program area and a data area, a DMA transfer area divided into a plurality of areas (first and second DMA transfer areas, for example).

Before the start of DMA transfer, the CPU writes the DMA transfer data to the first DMA transfer area. After the CPU writes all of the data up to the last data in the first DMA transfer area, it sets the DMA authorization bit in the DMA control register to authorize the DMA transfer to the first DMA transfer area. This causes the DMA controller to transfer the data written to the first DMA transfer area to the peripheral. While DMA transfer for the first DMA transfer area is not executed, the CPU writes DMA transfer data to the second DMA transfer area. Upon completion of DMA transfer up to the last data of the first DMA transfer area, the DMA controller immediately starts DMA transfer for the second DMA controller. While the DMA transfer for the second DMA transfer area is not executed, the CPU writes DMA transfer data to the first DMA transfer area. Thus, the first and the second DMA transfer areas are alternatively subjected to DMA transfer.

The operation of DMA transfer between the memory and a peripheral is described next. If there occurs a need for DMA transfer at a peripheral, the peripheral activates the DMA transfer request signal and provides it to the DMA controller. Activation of the DMA transfer request signal causes the DMA controller request the right to use bus to the CPU. The DMA controller obtaining the right to use the bus, outputs the DMA transfer address information of the first DMA transfer area to the address bus and at the same time activates the memory read signal and outputs the transfer data from the memory to the bus. Then, the DMA controller activates the DMA write signal for the peripheral to write the DMA transfer data.

Each time a DMA transfer is executed, the memory address register contents are updated and the value at the terminal counter decrements by "1". If the peripheral does not generate a continuous DMA transfer request, the DMA controller notifies the CPU of abortion of the right to use the bus. When recovering the right to use bus, the CPU resumes program execution. When DMA transfer as described above is repeated until completion of data transfer for the required number of transfers (when the terminal counter value becomes "0" by decrement), the DMA controller prepares for the next DMA transfer request. It also notifies the CPU of the completion of DMA transfer by activating the DMA interruption request signal.

When such an interruption request signal is generated, the CPU saves the Program Counter (PC) and the Program Status Word (PSW) to the stack and activates the interrupt processing program routine. This program routine processing judges whether to continuously execute the DMA transfer or not. The routine ends without further processing for continuous execution, but resets the DMA authorization bit before termination if the transfer is not continued. Upon termination of the interrupt program routine, the CPU restores the PC and PSW from the stack.

In conventional data transfer control using DMA, as described above, the interrupt processing routine generated upon termination of DMA transfer for one DMA transfer area resets the DMA authorization bit when the next DMA transfer is not continuously executed. In this method, however, there was a drawback that DMA transfer for the next area is executed if a next DMA transfer request is generated before resetting of the DMA authorization bit.

In addition, in a conventional DMA transfer control device has another drawback that when it is required to stop DMA transfer in emergency due to an error occurring during data processing, for example, the transfer could not be stopped until DMA transfer for all the data in the area under execution is completed.

SUMMARY OF THE INVENTION

An object of the present invention is to provide a data transfer control device facilitating switching between execution or inhibition of data transfer for the next area when data transfer for one transfer area is completed and also enabling stop in emergency without waiting for the end of data transfer of the transfer data currently under transfer if the data transfer currently executed needs to be stopped urgently.

Another object of the present invention is to provide a data transfer control device enabling control over continuance or inhibition of data transfer without management at the CPU over the number of areas to be data transferred.

According to a preferred embodiment of the present invention, a data transfer control device, using direct memory access, is used to control data transfer between a memory and a peripheral. The data transfer control device comprises an address storing means to store the memory address of the data for data transfer. Means is provided to update the memory address each time a data transfer is executed. Data number storing means are provided to store the number of data to be transferred, means to update the value at the data number storing means each time a data transfer is executed as well as an execution control means to execute transfer of data in the memory shown by the address storing means according to data transfer request. And the execution control means further comprises authorization information storing means to store the information indicating whether to authorize or inhibit the execution of data transfer upon data transfer request, next area information storing means to store in advance the information indicating whether to execute the data transfer for the next transfer area, and loading means to load the information in the next area information storing means to the authorization information storing means when the value at the data number storing means becomes a predetermined value, so as to execute or inhibit the data transfer according to the value at the authorization information storing means.

According to another preferred embodiment, a data transfer control device as above further comprises next area address storing means to store in advance the address of the next transfer area to be set at the address storing means when the value at the data number storing means becomes the predetermined value. A next area data number storing means is also provided to store in advance the number of transfer data for the next area to be set at the data number storing means.

According to still another preferred embodiment, a data transfer control device as above further comprises means to authorize transfer at the next area information storing means when data transfer for the next area is to be continued or to inhibit transfer when it is not to be continued.

According to a further preferred embodiment of the present invention to attain the above objects, a data transfer control device comprises means to directly set the authorization information storing means upon request for emergency stop of transfer.

According to still another preferred embodiment, a data transfer control device comprises transfer area number storing means to store the number of transfer areas to be continuously data transferred. An area number update means is provided to update the value at the transfer area number storing means when the value at the transfer data number storing means becomes a predetermined value as a result of update. Further provided are means to set the value stored in the next area information storing means to the transfer authorization information storing means when the value at the transfer data number storing means becomes a predetermined value as a result of update. At the next area information storing means, the information to inhibit the transfer is set in advance.

Other objects, characteristics and effects of the present invention will be clarified in the detailed description below.

BRIEF DESCRIPTION OF THE DRAWINGS

FIG. 4 is a timing chart of DMA transfer operation according to a first embodiment of the present invention;

DESCRIPTION OF THE PREFERRED EMBODIMENT

Figure 1:
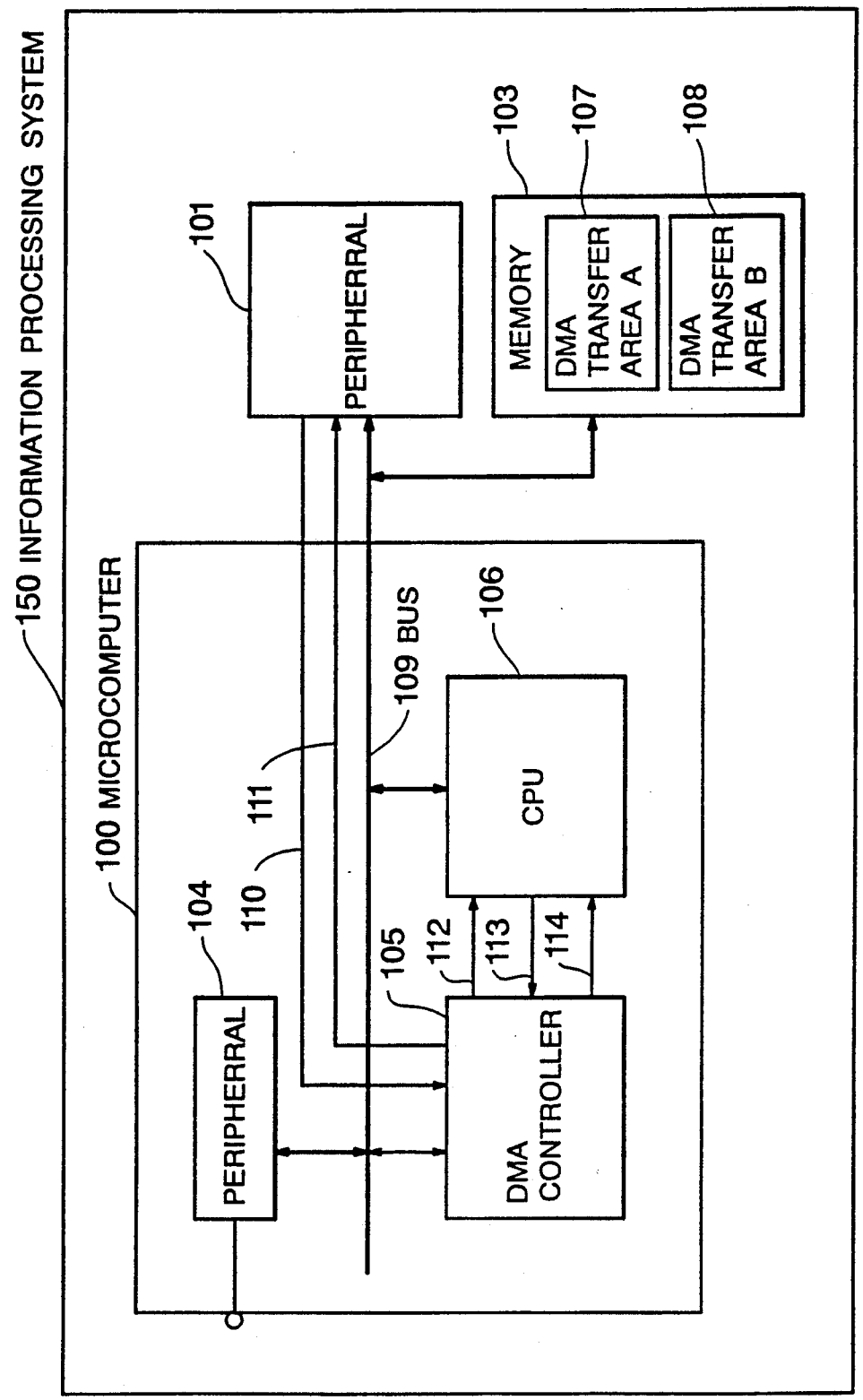
FIG. 1 is a block diagram to show the configuration of an information processing system using a DMA controller according to a first embodiment of the present invention.

Referring to the figures, preferred embodiments of a data transfer control device according to the present invention will be described below. FIG. 1 is a block diagram to show the configuration of an information processing system 150 using a microcomputer 100 incorporating a DMA controller 105, which is a data transfer control device according to the present invention.

The information processing system 150 comprises a microcomputer 100, a peripheral 101 (a printer controller, for example), and a memory 103. The microcomputer 100 comprises a CPU 106, a peripheral 104 (data receiving control circuit, for example), and a DMA controller 105 as a data processing circuit to execute and control the data transfer processing between the peripheral 101 and the memory 103. The microcomputer 100 controls the operation of the entire information processing system; for example, it processes the data received by the peripheral 104, writes it to the area for DMA transfer in the memory 103 and then transfers that data to the peripheral 101 (printer controller, for example) using the DMA controller 105. The peripheral 101 is provided with a buffer to read or write data and serves for printing, displaying or other processing proper to the peripheral using the data sent to the above buffer by the DMA controller 105.

The memory 103 has not only a program area and a data area for the CPU 106, but also an area for DMA transfer divided into two: a DMA transfer area A 107 and a DMA transfer area B 108. The memory stores various data for the information processing system via the bus 109 under control of either of the CPU 106 or the DMA controller 105.

The CPU 106 of the microcomputer 100 has a program counter (PC), a program status word (PSW) and various control registers inside and serves for operation controls including execution control of various instructions and control of the right to use the bus 109 utilized for transfer of addresses, data and read/write signals to or from the DMA controller 105.

Figure 2:
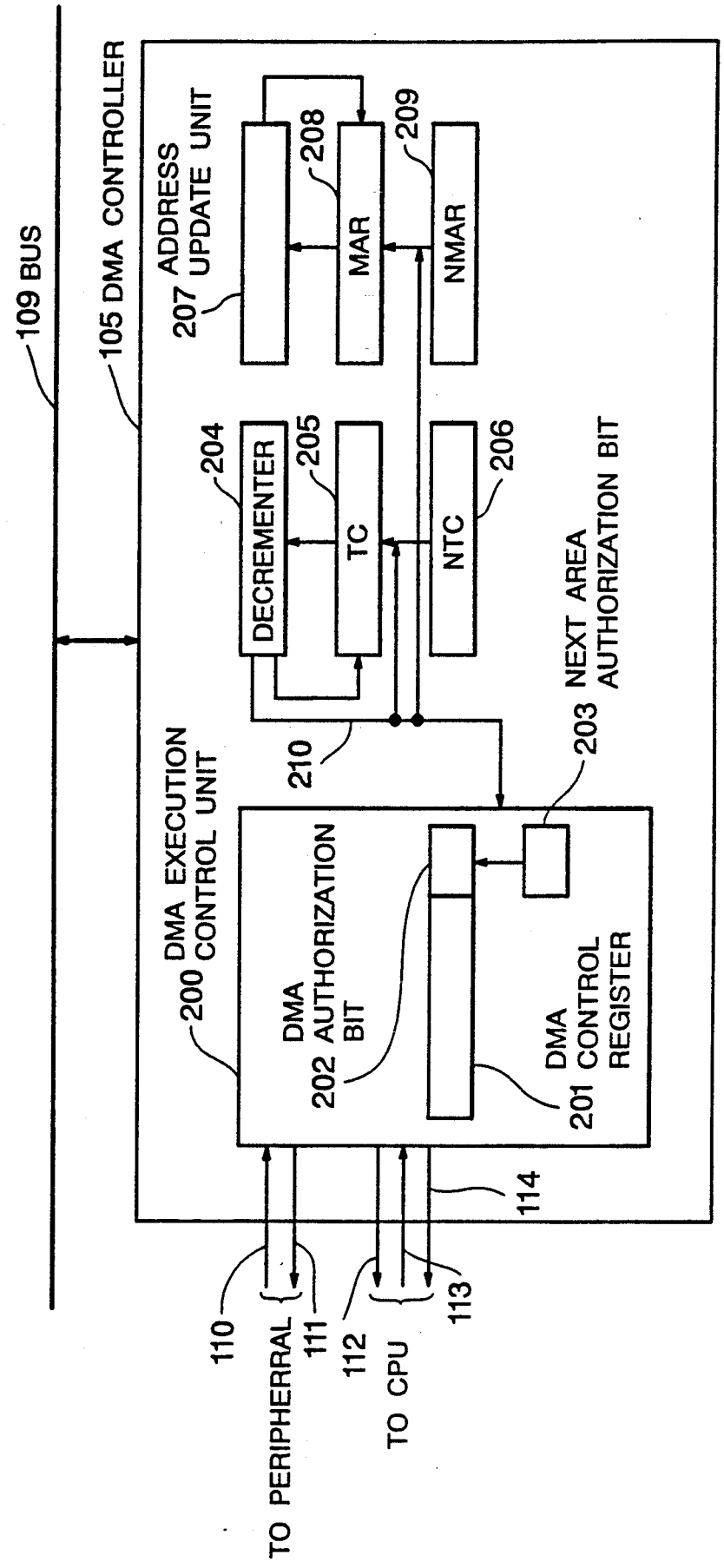
FIG. 2 is a block diagram to show the configuration of the essential part of the DMA controller according to a first embodiment of the present invention.

FIG. 2 is a block diagram to show the configuration of the essential part for the DMA controller 105 as described above. The controller 105 of the microcomputer 100 is, as shown in FIG. 2, provided with a memory address register (MAR) 208 to store the address information for DMA transfer data in the DMA transfer area A 107 or the DMA transfer area B 108 in the memory 103, an address update unit 207 to update the contents in the memory address register 208, a next memory address register (MNAR) 209 to store the initial address of the area to be subjected to the next DMA transfer, a terminal counter (TC) 205 to store the number of transfer data to be DMA transferred in the DMA transfer area A 107 or the DMA transfer area B 108, a decrementer 204 which decreases the value at the terminal counter 205, a next terminal counter (NTC) 206 to set the number of transfer data in the area subjected to the next DMA transfer and a DMA execution control unit 200 for DMA transfer control.

The DMA execution control unit 200 is provided with a DMA control register 201 having a DMA authorization bit to specify authorization or inhibition of DMA transfer. The DMA control register 201 further stores a bit to specify the data unit for DMA transfer (byte or word) and a bit to specify the direction of DMA transfer (I/O→memory or memory→I/O). In addition, the DMA execution control unit 200 comprises a next area authorization bit 203 to show whether to authorize or inhibit DMA transfer to the next DMA transfer area. The DMA authorization bit 202 shows that DMA transfer is authorized when set to "1", and that it is inhibited when set to "0". The next area authorization bit 203 shows that the DMA transfer for the next DMA transfer area is authorized when set to "1" and that it is inhibited when set to ∓0".

In initialization, the initial address of the first DMA transfer area is set to the memory address register 208, the number of DMA transfer data for the first DMA transfer area to the terminal counter 205, the initial address of the next DMA transfer area to the next memory address register 209, and the number of transfer data for the next DMA transfer area to the next terminal counter 206 by the CPU 106 prior to start of DMA transfer. When the DMA controller 105 detects the DMA transfer request signal 110 from the peripheral 101, it obtains the right to use the bus from the CPU 106 by sending the DMA service request signal 112 as the signal to ask for the right to use the bus and receiving the DMA service authorization signal 113 as the signal to authorize to use the right, and then executes DMA transfer between the memory 103 and the peripheral 101.

Next, the software processing at the CPU 106 when data are transferred from the memory 103 to the peripheral 101 is described.

Suppose here that DMA transfer is executed starting from the DMA transfer area A 107, and after its termination for this area, it is continuously executed for the DMA transfer area B 108, and then for the DMA transfer area A 107 again. In short, DMA transfer is executed for two areas above alternatively. The CPU 106 initializes the registers in the DMA controller 105 to provide DMA transfer information. Specifically, the CPU 106 sets the initial address of the DMA transfer area A 107 to the memory address register 208, the initial address of the DMA transfer area B 108 to the next memory address register 209, the number of DMA transfer data for the DMA transfer area A 107 to the terminal counter 205, and the number of DMA transfer data for the DMA transfer area B 108 to the next terminal counter 206. Before starting DMA transfer, the CPU 106 writes DMA transfer data to the DMA transfer area A. After the CPU 106 finishes writing up to the last data for the DMA transfer area A 107, the CPU 106 sets the DMA authorization bit 202 in the DMA control register 201 to "1" to authorize DMA transfer. The DMA controller 105 DMA transfers the data written to the DMA transfer area A 107 to the peripheral 101. The CPU 106 writes the DMA transfer data to the DMA transfer area B 108 while DMA transfer to the DMA transfer are A 107 is not executed. Upon completion of DMA transfer up to the last data for the DMA transfer area A 107, the DMA controller 105 immediately starts DMA transfer for the DMA transfer area B 108. The CPU 106 writes the DMA transfer data to the DMA transfer area A 107 while DMA transfer to the DMA transfer area B 108 is not executed. Thus, the DMA transfer area A 107 and the DMA transfer area B 108 are alternatively subjected to DMA transfer, and also to transfer data writing by the CPU 106.

Figure 3A:
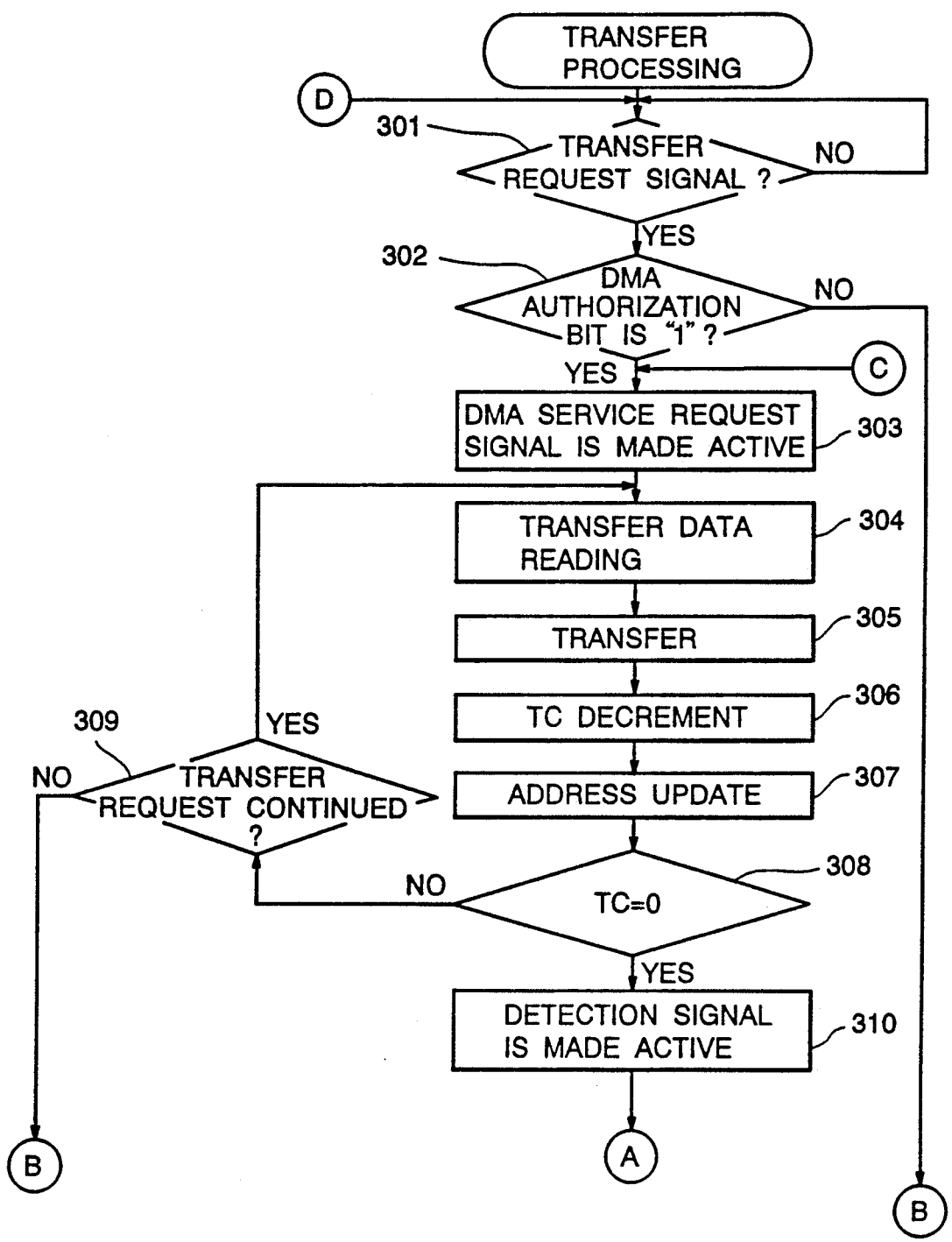
FIGS. 3A and 3B are a flowchart to illustrate the contents of DMA transfer control using the DMA controller according to a first embodiment shown in FIG. 1.
Figure 3B:
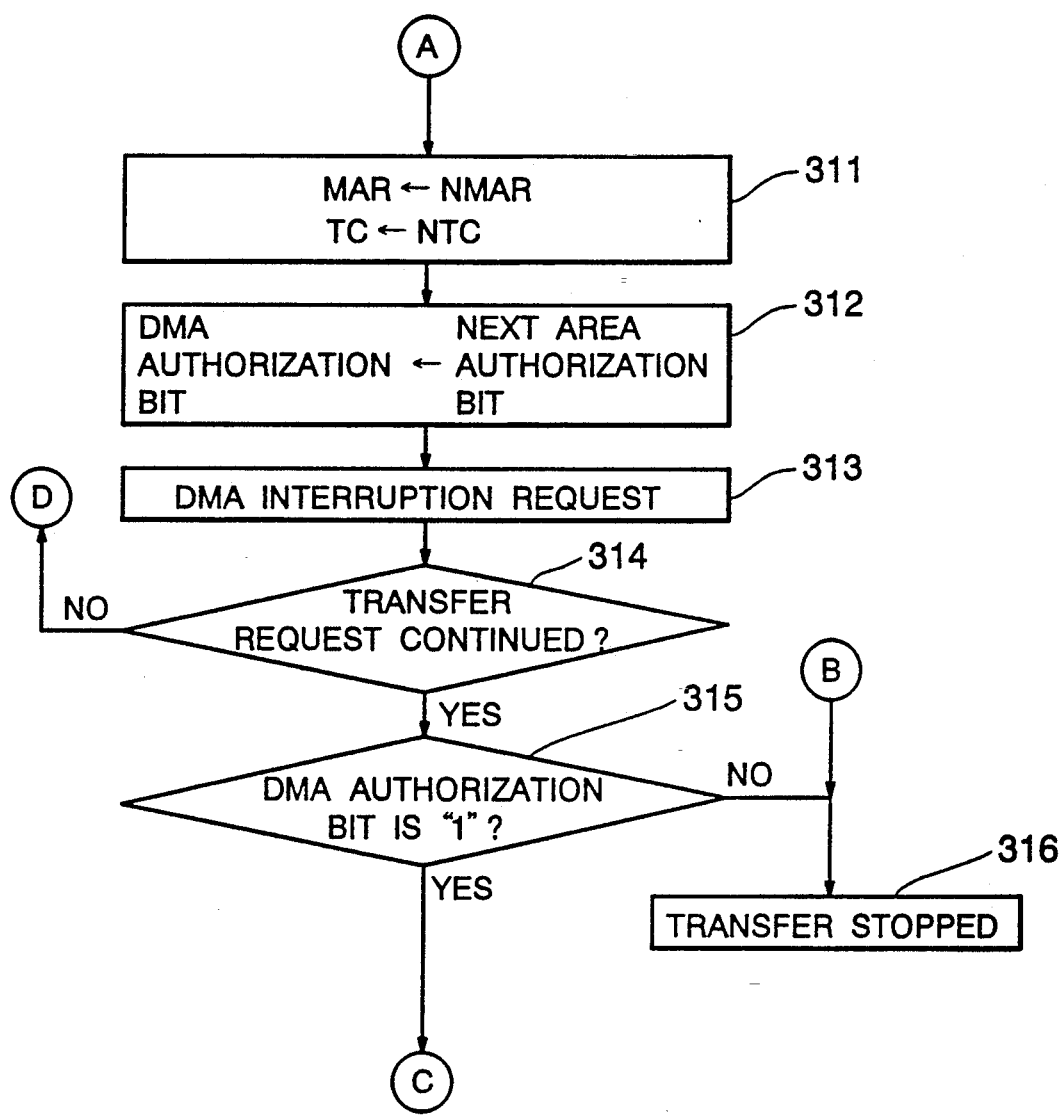

Next, referring to the flowchart of FIGS 3A and 3B and the timing chart of FIG. 4, the operation of DMA transfer from the memory 103 to the peripheral 101 by the DMA controller 105 is specifically described now.

When the peripheral 101 needs to execute DMA transfer, it activates the DMA transfer request signal 110 to the DMA execution control unit 200 (Step 301). If the DMA authorization bit 202 is set to "1" here (Step 302), the DMA execution control unit 105 activates the DMA service request signal (Step 303) and sends it to the CPU 106. If the DMA authorization bit 202 is set to "0", the DMA service request signal 112 is not activated so that transfer is not performed.

When the CPU 106 detects that DMA service request signal 112 is activated, (step 303) it activates the DMA service authorization signal 113 with keeping the contents in PC, PSW and other registers as they were during program execution, and notifies the DMA controller 105 of the acquisition of the right to use the bus.

Obtaining the right to use the bus 109, the DMA controller 105 outputs the address information for DMA transfer shown by the contents in the memory address register 208 to the bus 109, and at the same time activates the memory read signal (RD) to read the transfer data from the DMA transfer area A 107 to the bus 109 (Step 304), and outputs the DMA write signal (IOWR) 111 to the peripheral 101 (Step 305), thereby causing the peripheral 101 to write transfer data.

Each time DMA transfer as described above is executed, the value at the terminal counter 205 is read to the decrementer 204, decreased by "1" and then rewritten to the terminal counter (Step 306). Also, each time DMA transfer is executed, the contents in the memory address register 208 are read to the address update unit 207, updated to the address for the next DMA transfer by increment or decrement, and then rewritten to the memory address register 208 (Step 307).

Next, if DMA transfer requests is continuously generated, the terminal counter 205 is checked whether it has "0" or not in Step 308. If the value at the counter is not "0", the system proceeds to Step 309. If the peripheral 101, for example, does not continuously generate DMA transfer request signal 110 here, the DMA controller 105 makes the DMA service request signal 112 inactive, notifies the CPU 106 of its abortion of the right to use the bus, and terminates the DMA transfer operation. When the CPU 106 recovers the right to use the bus, it restarts program execution. If DMA transfer request signal 110 continues to be active in Step 309, the system returns to the Step 304 and the DMA controller 105 continues to execute DMA transfer similar to above for the address to be DMA transferred as shown by updated memory address register 208.

Each time DMA transfer as described above is executed, the value at the terminal counter 205 is decreased. When the terminal counter 205 shows 0 (Step 308), i.e. when DMA transfer of all data in the DMA transfer area A 107 is completed, the TC zero detection signal 210 is made active (Step 310). When this detection signal 210 is made active, the contents in the next memory address register 209 and those in the next terminal counter 206 are loaded to the memory address register 208 and to the terminal counter 205 respectively (Step 311). Thus, the system prepares for transfer of next DMA transfer area B 108. The above detection signal 210 is also supplied to the DMA execution control unit 200. This active detection signal 210 causes the DMA execution control unit 200 to set the contents in the next area authorization bit 203 to the DMA authorization bit 202 (Step 312), activate the DMA interruption request signal to the CPU 106 (Step 313), and then notify the CPU 106 of the completion of transfer for the DMA transfer area A 107.

In Step 314, it is checked whether DMA transfer request signal is continued, and if not, the system returns to Step 301 and waits for another transfer request signal. If DMA transfer request signal is continued, the system proceeds to the next step.

The next area authorization bit 203 has the information whether to perform DMA transfer for the next DMA transfer area B 108. If DMA transfer for the next DMA transfer area is to be performed, the next area authorization bit 203 has "1". In this case, when the contents in the next area authorization bit 203 are stored to the DMA authorization bit 202 in Step 312, the DMA authorization bit 202 is kept to be active ("1") for Step 315, and when another DMA transfer request is generated (Step 314), the DMA service request signal 112 is activated and DMA transfer is continuously executed from the DMA signal area B 108. In the timing chart of FIG. 4, (A) shows the point where the DMA transfer switches from the DMA transfer area A 107 to the DMA transfer area B 108.

Figure 5:
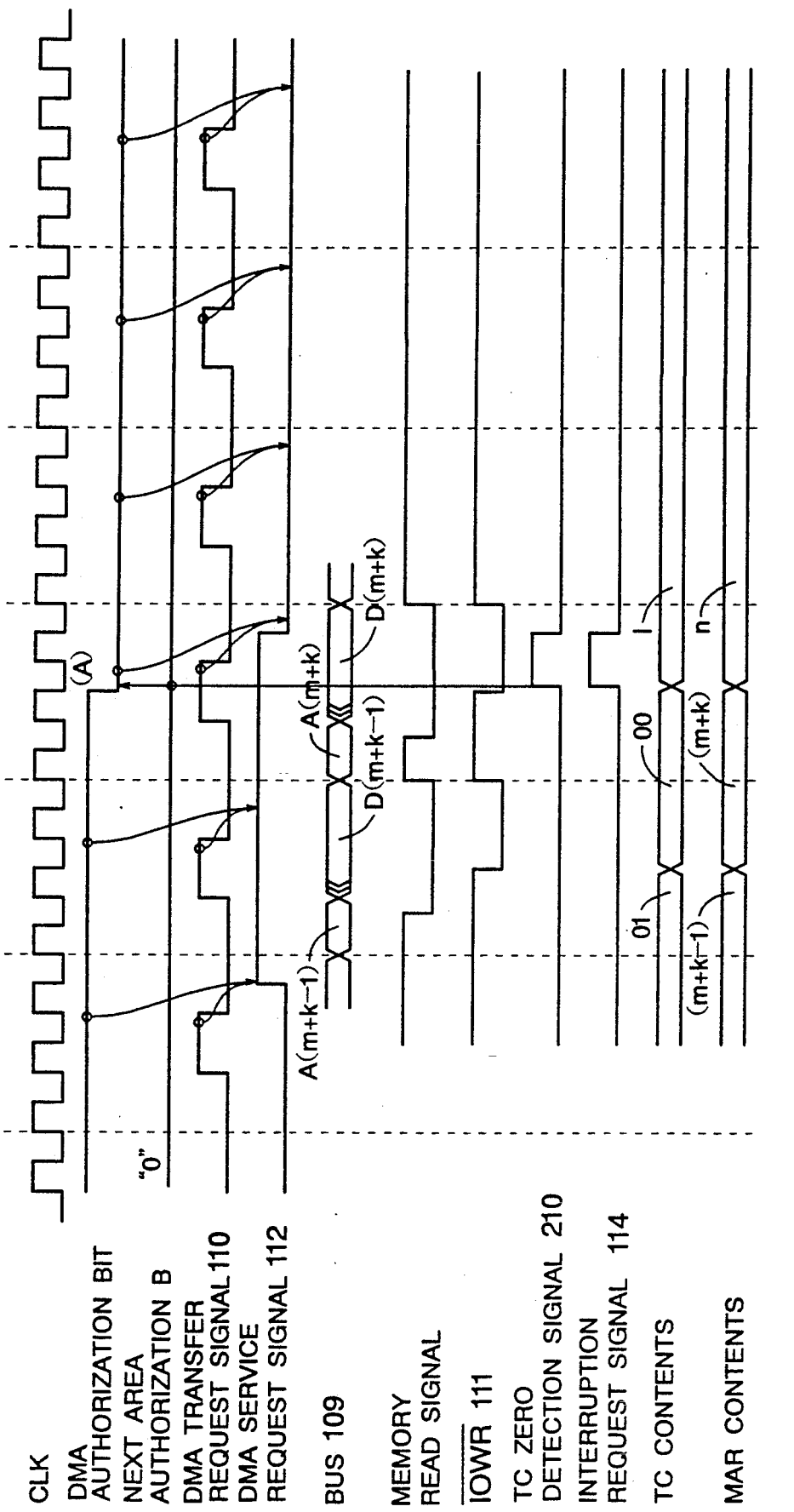
FIG. 5 is a timing chart of DMA transfer operation according to a first embodiment of the present invention.

If DMA transfer for the next DMA transfer area B 108 is not to be executed, the next area authorization bit 203 has "0" in Step 315. This resets (gives "0" to) the DMA authorization bit 202, which means that the DMA authorization bit 202 becomes "0" in Step 315. When the next DMA transfer request is generated, the DMA transfer request is masked and the DMA service request signal 112 is not activated, and the processing stops without next DMA transfer (Step 316). In the timing chart of FIG. 5, (A) shows the point where the transfer stops without next transfer for the DMA transfer area B 108 after DMA transfer for the DMA transfer area A 107.

Figure 6:
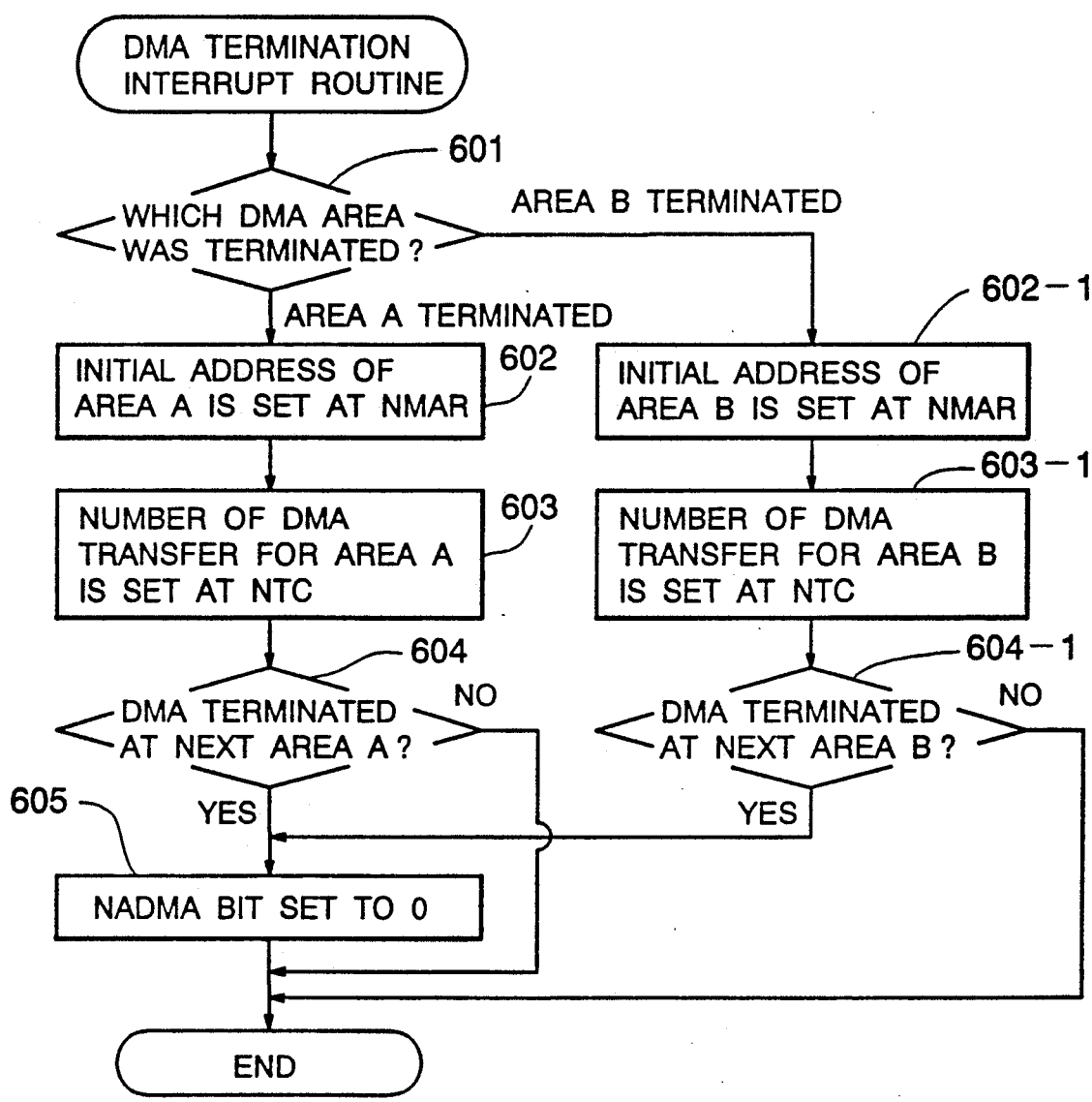
FIG. 6 is flowchart to illustrate the interrupt processing program routine by the CPU in DMA transfer according to a first embodiment of the present invention.

On the other hand, the CPU 106 performs the processing as shown in FIG. 6 according to the interrupt processing program routine, which is activated by the completion of DMA transfer for the DMA transfer area A 107. Firstly, it is checked in which DMA transfer area DMA transfer has terminated (Step 601). Suppose now, as in the example above, that the transfer for the DMA transfer area A 107 has been completed and the transfer for the next DMA transfer area B 108 is being conducted at present. As preparation for starting DMA transfer for the DMA transfer area A immediately after completion of DMA transfer for the DMA transfer area B, the DMA transfer starting address of the DMA transfer area A 107 is set to the next memory address register 209 and the number of transfer data for the DMA transfer area A 107 to the next terminal counter 206 (Steps 602 and 603). Then, after completing DMA transfer up to the last data of the DMA transfer area presently subjected to DMA transfer (area B 108), it is determined whether to execute DMA transfer for the next DMA transfer area (area B 107) continuously (Step 604). If not, the NEDMA bit 203 is reset to "0" (Step 605). If DMA transfer is to be executed, the NEDMA bit 203 is set to "1" before termination of the processing. Then, when interrupt processing program routine is activated for the next time, the system will be in the situation where transfer for the DMA transfer area B 108 has been completed and the transfer for the DMA transfer area A 107 is being conducted. This causes the steps from Step 602-1 to 604-1 and 605 to be similarly executed.

As described above, by setting or resetting the next area authorization bit 203 for the next DMA transfer area in the DMA transfer termination interrupt processing routine, DMA transfer for the next area may be continuously executed or stopped when the DMA transfer presently being conducted is completed.

If, due to any error or other factors during DMA transfer data generation, the current DMA transfer needs to be stop in emergency, the DMA authorization bit 202 may be directly reset by the CPU 106. This causes, even if the next DMA transfer request is generated, the DMA transfer request to be masked by the DMA authorization bit 202 and prevents the DMA service request signal 112 to be activated, which results in stop of DMA transfer. FIG. 4 (B) shows the status when the DMA authorization bit 202 is reset by the CPU 106 for stopping the transfer.

Figure 7:
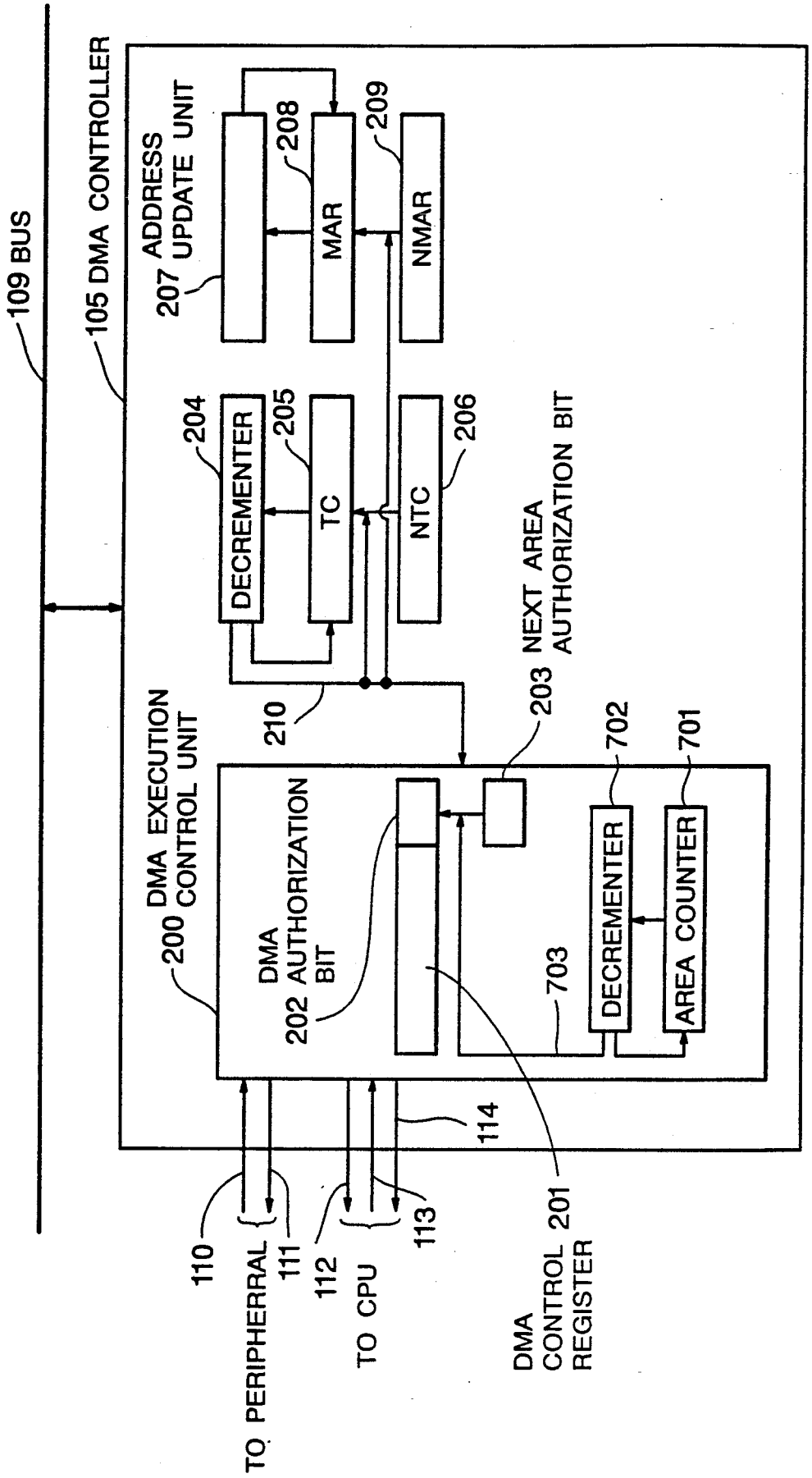
FIG. 7 is a block diagram to show the configuration of the essential part of the DMA controller according to a second embodiment of the present invention.

Referring to FIG. 7, a second embodiment of the data transfer control device according to the present invention is described now. Since this embodiment has substantially the same configuration as the first embodiment, description below is limited to the parts different from the first embodiment.

The data transfer control device of this embodiment has in the DMA execution control unit 200 a DMA control register (DCR) 201 including DMA authorization bit 202 and others and a next area authorization bit 203, and is further provided with an area counter 701 to show the number of DMA transfer areas to be continuously subjected to DMA transfer and a decrementer 702 to decrease the value at the above area counter 701.

Prior to DMA transfer, the CPU initializes a terminal counter (TC) 205, a next terminal counter (NTC) 206, a memory address register (MAR) 208 and a next memory address register (NMAR) 209 as in the first embodiment, and sets the number of DMA transfer areas for which DMA transfer is continuously executed to the above area counter 701. The next area authorization bit 203 is set to "0". Then, with setting the DMA authorization bit 202, DMA transfer for the DMA transfer area A 107 is started.

Figure 8A:
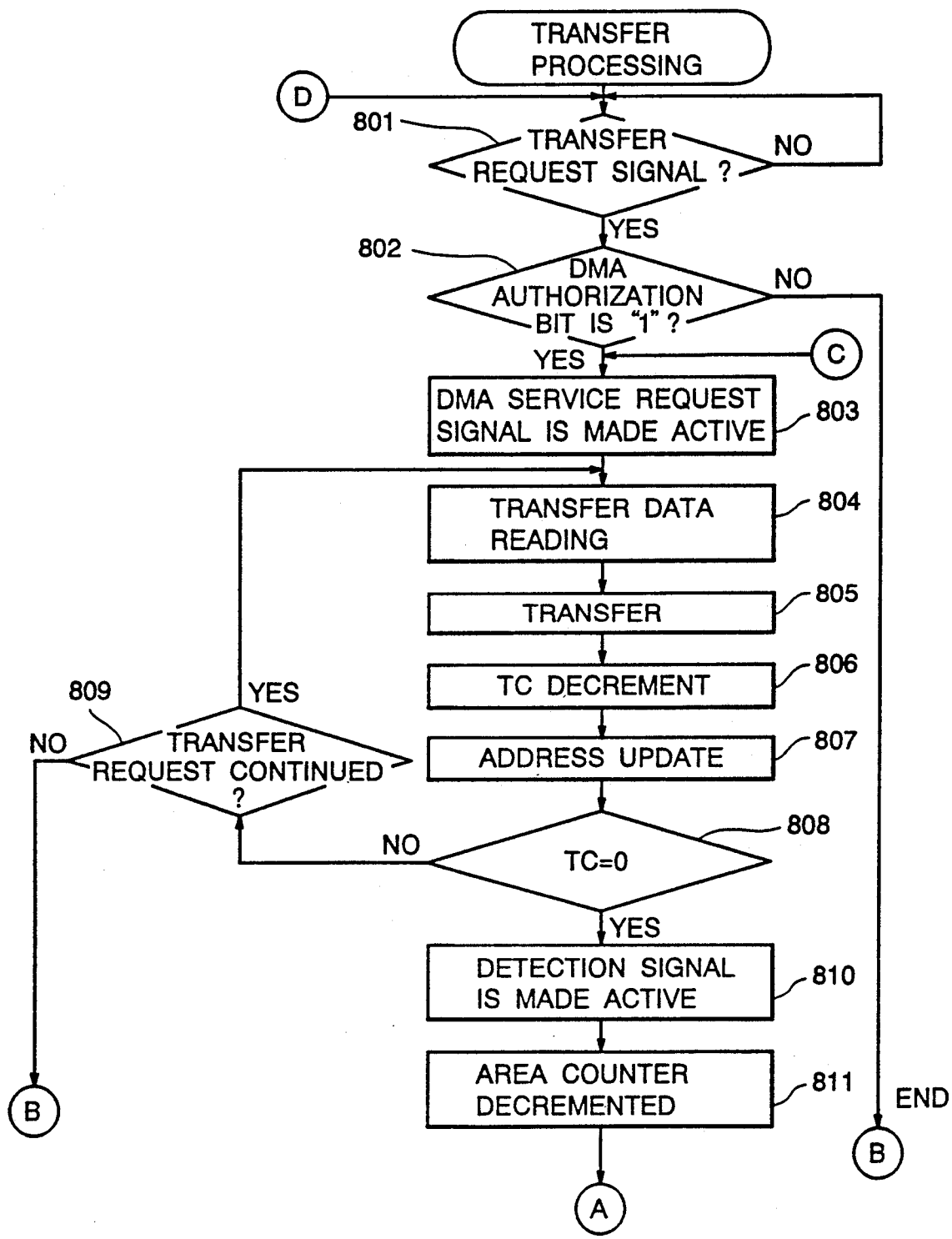
FIGS. 8A and 8B are a flowchart to illustrate the contents of DMA transfer control using the DMA controller according to a second embodiment shown in FIG. 7.
Figure 8B:
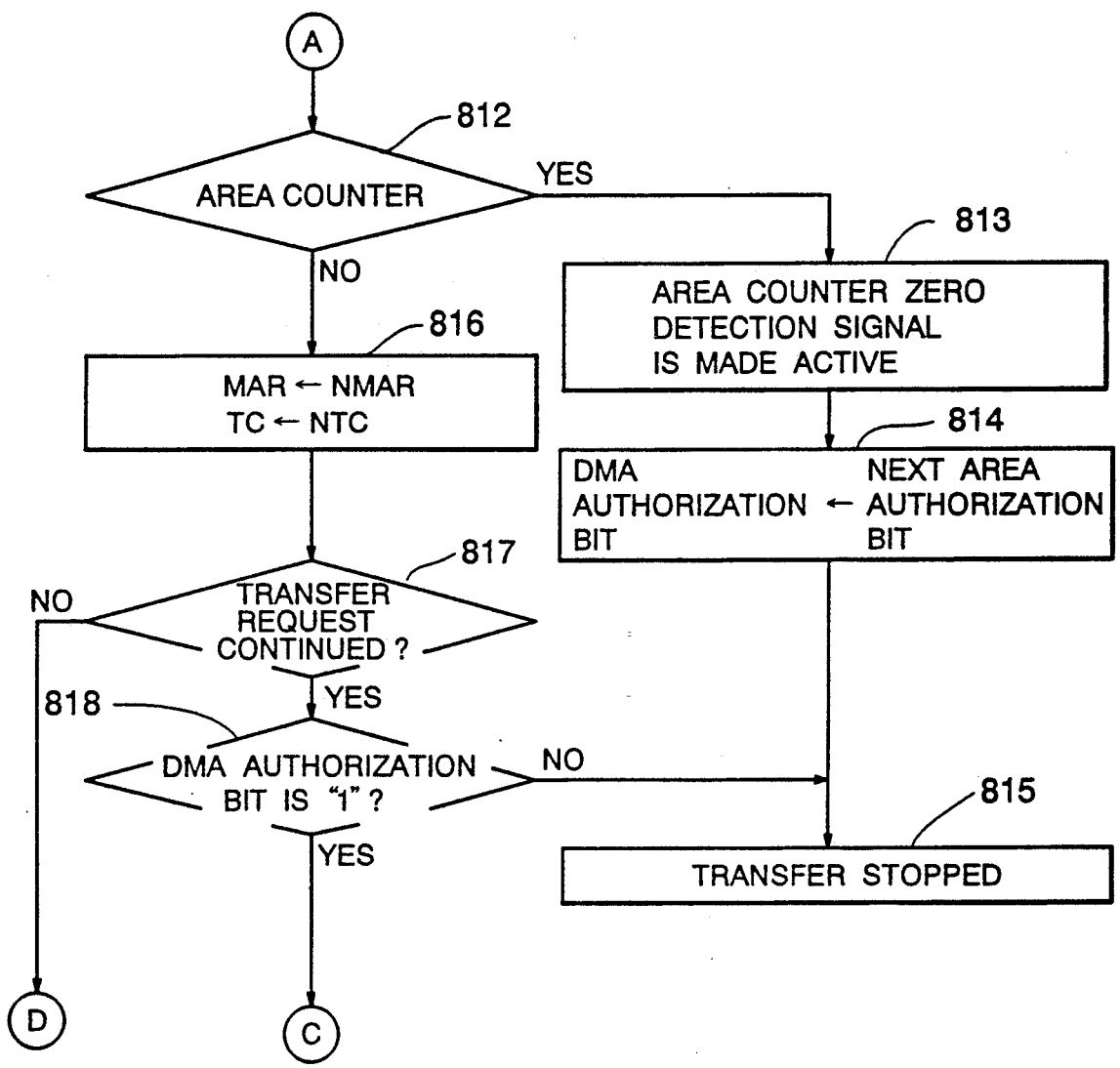

Now referring to the flowchart of FIGS. 8A and 8B, the operation of the second embodiment is described.

When the DMA transfer request signal 110 is activated, DMA transfer is executed as in the first embodiment (Step 801). Description of the procedures in Steps 802 to 809 thereafter is omitted since they are the same as those in Steps 302 to 309 in FIG. 3.

In Step 808, when the value at the terminal counter 205 is decreased to "0", i.e. when DMA transfer for a DMA transfer area is completed, the TC zero detection signal 210 is activated (Step 810), and the value in the area counter 701 is read to the decrementer 702, decreased by "1" and then rewritten to the area counter 701 (Step 811). Each time the value at the terminal counter 205 is decreased to "0", the value in the area counter 701 is decreased. When the value at the area counter 701 becomes "0" as a result of decrement (Step 812), the area counter zero detection signal 703 is made active. Upon this detection signal 703, the DMA execution control unit 200 detects the completion of DMA transfer for all areas to be continuously DMA transferred and loads the next area authorization bit 203 to the DMA authorization bit 202 (Step 814). Here, the next area authorization bit 203 has "0" and causes the DMA authorization bit 202 to store "0". Thus, even if a next DMA transfer request is generated, it is masked by the DMA authorization bit 202 and the DMA service request signal 112 is not activated, which results in prompt termination of DMA transfer (Step 815).

If, in Step 812, the area counter 701 has a value other then "0", the contents in the next memory address register 209 and those in the next terminal counter 206 are loaded to the memory address register 208 and the terminal counter 205 respectively (Step 816). This prepares for transfer for the next DMA transfer area. In Step 817, it is checked whether the DMA transfer request signal continues or not. If not, 801 and waits for another transfer request signal. If the DMA transfer request signal continues to be active, then the system proceeds to the next step.

Next, the DMA authorization bit 202 is checked whether it has "1" (Step 818). If so, the DMA service request signal 112 is activated and DMA transfer continues to be executed for the next DMA transfer area. If, in Step 818, the DMA authorization bit 202 is "0", the DMA transfer request is masked and the DMA service request signal 112 is not activated, resulting in that the transfer operation terminates without next DMA transfer (Step 815).

In this embodiment, the number of DMA transfer areas for DMA transfer is in advance stored in the area counter 701, and when DMA transfer is completed for the number of DMA transfer areas specified by the area counter 701, the DMA transfer is inhibited. Thus, DMA transfer can be properly stopped without management at the CPU 106 on the number of areas where DMA transfer is to be executed. This eliminates the need of interrupt request to the CPU 106 as in the first embodiment.

For example, if data to be printed is generated at the CPU 106 and transferred to a printer corresponding to the peripheral 101, it may be desired to send the print data by continuously sending DMA transfer areas, each of which corresponds to the data for one line, and to stop the operation when data for one page have been DMA transferred. In this case, by setting the number of lines in a page at the area counter 701, when the data for one page are completely DMA transferred, DMA transfer can be stopped without operation by the CUP 106.

In addition, if there occurs a need for emergency stop of the DMA transfer being executed due to error during generation of DMA transfer data or other factors, DMA transfer can be stopped by directly resetting the EDMA bit 202 by the CPU 106 for immediate stop as in the first embodiment.

The memory address register 208 is directly updated in the first and the second embodiments, but even if the address information for DMA transfer areas is to be generated by addition or subtraction of the values at the memory address register 208 and the terminal counter 205, it is obvious to those skilled in the art that similar configuration can be used to realize the invention.

As described above, upon completion of DMA transfer for the number specified for one DMA transfer area, the data transfer control device using DMA according to the present invention automatically updates the initial address of the next DMA transfer and the number of transfers for the next DMA transfer area, and if continuance of DMA transfer for the next DMA transfer area is specified, causes DMA transfer to be continuously executed for the updated address and the number of transfers. If continuance of DMA transfer for the next DMA transfer area is inhibited, it automatically stops DMA transfer operation. Thus, if data to be printed are generated at the CPU and then transferred to the printer by DMA transfer, for example, print data are continuously DMA transferred with treating one line as DMA transfer area and, by specifying that the DMA transfer is not continued for the next transfer area while DMA transfer for the last line, DMA transfer can be stopped when the DMA transfer of the data for one page is completed.

In addition to the above operation, when there is a need to urgently stop DMA transfer due to any error during data processing, for example, resetting of DMA transfer authorization bit enables immediate stop of DMA transfer without waiting for the end of DMA transfer for the DMA transfer area currently under transfer.

Obviously many modifications and variations of the present invention are possible. It is intended to cover in the appended claims all such modifications as fall within the true spirit and scope of the invention.

What is claimed is:

1. A data transfer control device to control, using direct memory access, data transfer between a memory having a plurality of transfer areas for storing data transferred from a CPU and a peripheral comprising:

address storing means for storing the address of data in a transfer area of said memory, means for updating the address of said address storing means each time a data transfer is executed, data number storing means for storing the number of transfer data to be transferred;

means for updating he value of said data number storing means each time a data transfer is executed, and execution control means for executing transfer of data in a first transfer area addressed by said address storing means according to a data transfer request, said execution control means further comprising a first authorization means for storing the information indicating whether to authorize or inhibit the execution of data transfer upon a data transfer request, next transfer area authorization means for storing in advance the information indicating whether to execute the data transfer of a next transfer area, and loading means for loading information stored in said next transfer area authorization means to said first authorization means when the value at said data number storing means becomes a predetermined value, so as to execute or inhibit the data transfer according to the information stored at said first authorization means.

2. A data transfer control device of claim 1 further comprising:

next area address storing means for storing in advance the address of said next transfer area to be set at said address storing means when the value at said data number storing means becomes the predetermined value, and next area data number storing means for storing in advance the number of transfer data for said next transfer area to be set at the data number storing means.

3. A data transfer control device of claim 1 further comprising means for setting said authorization information to authorize transfer at said next information storing means when data transfer for the next area is to be continued and for setting said authorization information to inhibit transfer when it is not to be continued.

4. A data transfer control device of claim 1 further comprising means for directly setting said first authorization means upon request for emergency stop of transfer 5. A data transfer control device of claim 1 further comprising transfer area number storing means for storing the number of transfer areas to be continuously data transferred, area number update means for updating the value at said transfer area number storing means when the value at said transfer data number storing means becomes a predetermined value as a result of update, and means for setting the value stored in the next area information storing means to said transfer authorization information storing means when the value at said transfer data number storing means becomes a predetermined value as a result of update.

6. A data transfer control device of claim 5 wherein said authorization information to inhibit a data transfer is set at said next transfer area authorization means in advance.

* * * * *